(12) United States Patent
Lee et al.

(10) Patent No.: US 7,105,038 B2
(45) Date of Patent: Sep. 12, 2006

(54) GAS CONCENTRATION METHOD AND ITS APPARATUS

(75) Inventors: Junbae Lee, Seoul (KR); Seong-Moon Cho, Anyang-si (KR); Don-Hee Lee, Anyang-si (KR)

(73) Assignees: JEJ Co., Ltd., Seoul (KR); LG Electronics Inc., Seoul (KR)

( * ) Notice: Subject to any disclaimer, the term of this patent is extended or adjusted under 35 U.S.C. 154(b) by 0 days.

(21) Appl. No.: 10/497,320

(22) PCT Filed: Feb. 16, 2004

(86) PCT No.: PCT/KR2004/000312

§ 371 (c)(1),
(2), (4) Date: Jul. 9, 2004

(87) PCT Pub. No.: WO2004/087300

PCT Pub. Date: Oct. 14, 2004

(65) Prior Publication Data

US 2005/0081713 A1    Apr. 21, 2005

(30) Foreign Application Priority Data

| Feb. 18, 2003 | (KR) | 10-2003-0010176 |
| Feb. 18, 2003 | (KR) | 10-2003-0010178 |
| May 3, 2003 | (KR) | 10-2003-0028407 |
| May 7, 2003 | (KR) | 10-2003-0029102 |
| Jul. 25, 2003 | (KR) | 10-2003-0051275 |

(51) Int. Cl.
*B01D 53/047* (2006.01)

(52) U.S. Cl. .............. 95/96; 95/103; 96/130; 96/135; 96/143

(58) Field of Classification Search ............ 95/96–106, 95/130; 96/108, 109, 111, 115, 124, 130, 96/135, 143, 144
See application file for complete search history.

(56) References Cited

U.S. PATENT DOCUMENTS 3,430,418 A * 3/1969 Wagner ..................... 95/100

(Continued)

FOREIGN PATENT DOCUMENTS

EP    0589406 A2 *  3/1994

(Continued)

*Primary Examiner*—Robert A. Hopkins
(74) *Attorney, Agent, or Firm*—Birch, Stewart, Kolasch & Birch, LLP

(57) ABSTRACT

The present invention relates a method for concentrating a gas by applying a pressure difference to an adsorbent and an apparatus therefor, and particularly, a method for producing an enriched gas in a large amount by introducing a continuous production into every step of the process focusing on productivity rather than concentration of the product gas and an apparatus therefor. The present invention relates to a method incorporating the vacuum swing adsorption method with the pressure swing adsorption method, particularly the rapid pressure swing adsorption method which can continuously produce a desired material in a depressurization step to improve recovery rate of the desired material and productivity and an apparatus therefor. The apparatus according to the present invention is advantageously applied in a small size machine rather than for industrial uses. Particularly, when applied in a small size oxygen concentrator, it can be used in electric home appliances, air conditioners and water purifier, as well as medical products.

13 Claims, 6 Drawing Sheets

U.S. PATENT DOCUMENTS

| | | | | |
|---|---|---|---|---|
| 4,222,750 A | * | 9/1980 | Gauthier et al. | 95/102 |
| 4,349,357 A | * | 9/1982 | Russell | 95/26 |
| 4,406,675 A | * | 9/1983 | Dangieri et al. | 95/26 |
| 4,449,990 A | * | 5/1984 | Tedford, Jr. | 95/26 |
| 4,589,888 A | * | 5/1986 | Hiscock et al. | 95/100 |
| 4,599,094 A | * | 7/1986 | Werner et al. | 95/101 |
| 4,650,501 A | * | 3/1987 | Hiscock et al. | 95/100 |
| 4,684,377 A | * | 8/1987 | Haruna et al. | 95/102 |
| 4,802,899 A | * | 2/1989 | Vrana et al. | 96/109 |
| 4,925,461 A | * | 5/1990 | Gemba et al. | 95/98 |
| 4,981,499 A | * | 1/1991 | Hay et al. | 95/100 |
| 5,004,485 A | * | 4/1991 | Hamlin et al. | 96/111 |
| 5,074,892 A | * | 12/1991 | Leavitt | 95/96 |
| 5,114,441 A | * | 5/1992 | Kanner et al. | 95/98 |
| 5,122,164 A | * | 6/1992 | Hirooka et al. | 95/26 |
| 5,183,483 A | * | 2/1993 | Servido et al. | 95/98 |
| 5,223,004 A | * | 6/1993 | Eteve et al. | 95/98 |
| 5,246,676 A | * | 9/1993 | Hay | 423/219 |
| 5,266,102 A | * | 11/1993 | Gaffney et al. | 95/103 |
| 5,536,299 A | * | 7/1996 | Girard et al. | 95/101 |
| 5,540,758 A | * | 7/1996 | Agrawal et al. | 95/101 |
| 5,679,134 A | * | 10/1997 | Brugerolle et al. | 95/96 |
| 5,755,856 A | * | 5/1998 | Miyake et al. | 95/101 |
| 5,785,740 A | * | 7/1998 | Brugerolle et al. | 95/102 |
| 5,827,358 A | * | 10/1998 | Kulish et al. | 96/115 |
| 5,968,233 A | * | 10/1999 | Rouge et al. | 95/96 |
| 6,010,555 A | * | 1/2000 | Smolarek et al. | 95/98 |
| 6,068,680 A | * | 5/2000 | Kulish et al. | 95/98 |
| 6,090,185 A | * | 7/2000 | Monereau et al. | 95/102 |
| 6,113,672 A | * | 9/2000 | Kapoor et al. | 95/101 |
| 6,171,371 B1 | * | 1/2001 | Derive et al. | 95/98 |
| 6,238,458 B1 | * | 5/2001 | Monereau | 95/19 |
| 6,287,366 B1 | * | 9/2001 | Derive et al. | 95/100 |
| 6,340,382 B1 | * | 1/2002 | Baksh et al. | 95/96 |
| 6,406,520 B1 | * | 6/2002 | Lledos | 95/96 |
| 6,506,234 B1 | * | 1/2003 | Ackley et al. | 95/96 |
| 6,565,627 B1 | * | 5/2003 | Golden et al. | 95/96 |
| 6,641,645 B1 | * | 11/2003 | Lee et al. | 95/98 |
| 6,663,691 B1 | * | 12/2003 | Yamamoto et al. | 95/100 |
| 2003/0192431 A1 | * | 10/2003 | Lee et al. | 95/96 |
| 2003/0196550 A1 | * | 10/2003 | Keefer et al. | 95/96 |
| 2003/0205141 A1 | * | 11/2003 | Byrd et al. | 96/121 |

FOREIGN PATENT DOCUMENTS

| | | | |
|---|---|---|---|
| GB | 2163669 A | * | 3/1986 |
| JP | 2001-70727 A | * | 3/2001 |

* cited by examiner

GAS CONCENTRATION METHOD AND ITS APPARATUS

BACKGROUND OF THE INVENTION

1. Field of the Invention

The present invention relates to a method for producing an enriched gas having the concentration of a certain gas increased comprising separating the certain gas from a feed gas mixture by applying a pressure difference to an adsorbent selective for the certain gas, and an apparatus therefor.

2. Description of the Related Art

The method for concentrating a certain gas using an adsorbent to increase the concentration of the gas is representatively classified into a method using the difference between transit rates of gases by applying a pressure to a gas separation membrane and a method of PSA (Pressure Swing Adsorption) type using a zeolite molecular sieve (ZMS) or a carbon molecular sieve (CMS), in which a pressure difference is applied to a container packed with the sieve material, whereby a gas of a certain component is adsorbed to the adsorbent while a gas of a relatively less adsorbable component is separated. The PSA has been widely used in various fields since the proposal by Skarstrom.

According to the PSA type, the adsorption of a gas is carried out at normal (atmospheric) pressure or higher and the desorption and regeneration is carried out at atmospheric pressure. The PSA which has been developed since 1950's is widely used in the industrial production of oxygen and nitrogen and recently is also applied to a small size articles such as a water purifier, an air conditioner, an air cleaner and a medical appliance, as well as an air drying, an oxygen concentration and a hydrogen purification. Oxygen obtained from the PSA is widely used in the industries which continuously consumes oxygen, concretely the electric arc steel making process, the wastewater treatment by adding air to the wastewater, the pulp bleaching, an ozone generator and the like. In recent, an oxygen-enriched gas instead of air is used in combustion for the purpose of low nitrification (NOx) and high efficiency and the biochemical field such as fermentation. Particularly, the oxygen concentrator has been applied in electric home appliances for air conditioning in an office and at home. FIG. 1 shows a representative Skarstrom cycle of a standard basic four-step process of the PSA using two adsorbent beds. Here, Pl and Ph represent a relatively low pressure value and a relatively high pressure value, respectively, of the operating pressure. The process comprises essentially a feed pressurization step, a blowdown step and a purge step. The adsorption is carried out during the feed pressurization while the desorption is carried out during the blowdown step and the purge step. The typical $O_2$-PSA processes are described in, for example, U.S. Pat. No. 3,430,418; U.S. Pat. No. 4,589,888; U.S. Pat. Nos. 4,650,501 and 4,981,499. On the basis of the standard process, a pressure equalization step may be further added to construct a multi-step process. Since such multi-step process may show a severe fluctuation in discharge pressure, the number of the adsorbent beds should be increased to reduce the deviation of the fluctuation. The multi-bed system, though has a high efficiency, has a limitation in the size reduction. The PSA apparatus is advantageous for high concentration systems for medical use but disadvantageous for the electric home appliance aiming at the output rather than the concentration. Also, it has a defect in that the initial production cost is relatively high.

For example, referring to the conventional method (JP-A-No. 08-239204), as shown in FIG. 7, there are required a plurality of valves (14, 12a, 17a, 12b, 17b) or line (15) in an input port and also a plurality of valves (110a, 110b) in a production port. Also, a pressure equalizing line 112 for connecting an adsorbent bed A and adsorbent B is provided with a switch valve 113. Further, the pressure equalizing line 112 is provided with a detour pressure equalizing line 115 equipped with a locking means 114, which makes the structure complicated. An enriched gas is produced from lines 19a and 19b.

The PSA is subdivided into an original PSA type operated at atmospheric pressure or higher, a VPSA type operated at between atmospheric pressure or higher and vacuum pressure and a VSA type operated at atmospheric pressure or low, according to the operating pressure. The VSA type and the VPSA are exchangeably used, or inclusively designated the PSA. Examples of the V(P)SA type are disclosed in U.S. Pat. No. 5,122,164; U.S. Pat. No. 5,223,004 and U.S. Pat. No. 5,246,676.

Representative evaluation factors of the PSA are concentration, recovery rate and productivity. In the conventional methods, the process design and system design are laid out considering mainly concentration, recovery rate and the initial investment in accommodation and operating cost, since they are focused on their industrial application. The RPSA (Rapid PSA) which has been developed in 1970's focusing on the output of a product gas could produce an oxygen-enriched gas in a several times great amount using pressure depression generated in an adsorbent bed packed with fine particles, unlike most of the PSA, in which the depression inside the adsorbent bed is absent or ignored. That is, since a desired gas is continuously produced during the depression step unlike the common PSA, it is possible to increase the recovery rate of the desired gas and the productivity of the adsorbent. FIG. 2 shows the standard three-step process of the RPSA comprising a pressurization step, a delay step and a depressurization step. The delay step as a middle step may be omitted, where appropriate. As shown in FIG. 2, the production is continued in the respective steps and the pressurization step and the depressurization step take place in a short time of several seconds. Typical examples of the RPSA are disclosed in U.S. Pat. No. 4,406,675; U.S. Pat. No. 5,827,358; U.S. Pat. No. 6,068,680 and U.S. Pat. No. 6,565,627. The method of this type has been partially applied in an emergency oxygen supply apparatus for a pilot and some industrial uses but not yet applied in commercial small size home appliances.

For a small capacity oxygen concentrator to be combined with an air cleaner and an air conditioner for domestic use, the high concentration of the industrial use is actually meaningless since the ultimate oxygen concentration of a target space is at a level of about 21 to 23% where people feel pleasantness. For a water purifier, it is known that an oxygen concentration of 50% or higher is sufficient to increase the dissolved oxygen. Therefore, the adoption of the RPSA method which can accomplish high productivity is not preferable for a small size machine.

The PSA operated at a pressure of at least normal pressure shows good efficiency when constructed in a small size. However, when a commonly used pressure of 2 atm to 5 atm is used, problems of noise and heat generation of a pump and durability may occur. Therefore, it cannot be used in an electric home appliance for indoor use. Recently, there have been proposed methods for increasing recovery rate while reducing the adsorption/desorption pressure at maximum, such as U.S. Pat. No. 5,074,892, U.S. Pat. No. 6,010,555 and U.S. Pat. No. 6,506,234. However, these methods have limitations since a high performance adsorbent should be used and the adsorbent are hardly recycled. Also, since the methods are not focused on small size machines and productivity, they are only suitable for medical use but not for application in a small size home appliance. In order to be applied to a small size home appliance, a process to make the maximum productivity at low power consumption is needed.

The VPSA operated at between atmospheric pressure and vacuum pressure can guarantee a more quiet operation than the PSA. However, as described above, the conventional method has difficulties in the construction at a low cost due to the complex multi-step control and the use of a valve apparatus and a surge tank.

In the absolute VSA only operated at atmospheric or lower, the adsorption and desorption is carried out by means of a main vacuum pump and a concentrated gas is supplied using an air blower. Thus, this method is advantageous in that the problems related with noise and heat generation of a vacuum pump may work out considerably since the pressure difference applied on an adsorbent is small. However, two pumps should be essentially needed in the construction of a machine, which makes this method economically disadvantageous. Also, upon application in a small size machine, it is necessary to use a high performance adsorbent, since the productivity is low. Further, when 3or more of adsorbent beds are used in the construction of a machine, the valve control becomes complicated and thus is not suitable for use in a small size air conditioner.

SUMMARY OF THE INVENTION

Thus, in order to solve the foregoing problems, the present invention aims at realizing a simple continuous production process to increase productivity and simplify an apparatus. That is, the process can applied in a small gas concentration apparatus while producing a concentrated gas in a large amount.

The present invention also aims at realizing a simple process with high productivity using the VPSA or VSA which are relatively favorable in terms of low noise, low heat generation and durability, as compared to the PSA operated at a pressure of atmospheric pressure or higher.

The present invention aims at provision of a process focusing on recovery rate and productivity rather than production of a gas concentrated to a high concentration, and particularly, provision of a gas concentrator which can be constructed in a low noise and small size with a high performance adsorbent by applying the VSA only operated at a pressure of atmospheric pressure or less.

The present invention aims at provision of a gas concentrator which can be applied in a continuous production using two adsorbent beds, has little change in production flux, and can control the concentration of the concentrated gas.

In order to achieve the above-described objects of the present invention, according to an embodiment of the present invention, there is provided a gas concentration method for separating a certain gas by applying a pressure difference to an adsorbent having an adsorption power selective for the gas, comprising:

a first step of introducing a feed gas mixture through a supply port of a first adsorbent bed having a pressure lower than the feed gas mixture, adsorbing a more adsorbable component to an adsorbent in the first adsorbent bed while desorbing the adsorbed component from a second adsorbent bed by reducing the internal pressure of the second adsorbent bed, discharging a relatively less adsorbable component through a production port of the first adsorbent bed to produce an enriched gas and supplying a part of the enriched gas to a production port of a second adsorbent bed through a microtube connecting the production ports of the adsorbent beds;

a second step of reducing the internal pressure of the first adsorbent bed from the supply port to desorb the adsorbed component and increasing the pressure inside the second adsorbent bed from a supply port by supplying the feed gas mixture through the supply port of the second adsorbent bed to adsorb the more adsorbable component, in which a pressure gradient existing between the production ports and the supply ports of the first and second adsorbent beds is that the production port of the first adsorbent bed has a pressure higher than that of the production port of the second adsorbent bed, whereby a part of the product gas is supplied from the production port of the first adsorbent bed to the production port of the second adsorbent bed, and the product gas is continuously produced during this step with a moment when the enriched gas is simultaneously produced from the production ports of the first adsorbent bed and the second adsorbent bed;

a third step of reversing the pressure gradient between the production port of the first adsorbent bed and the production port of the second adsorbent bed in the second step so that the first adsorbent bed undergoes the desorption and the second adsorbent bed undergoes the adsorption, contrary to the first step, and discharging the enriched gas from the production port of the second adsorbent bed while supplying a part of the enriched gas produced from the production port of the second adsorbent bed to the production port of the first adsorbent bed; and a fourth step of supplying a part of the product gas from the production port of the second adsorbent bed to the production port of the first adsorbent bed by the pressure gradient between the adsorbent beds, contrary to the second step, increasing the pressure inside the first adsorbent bed from the supply port by supplying the feed gas mixture through the supply port to carry out the adsorption, reducing the pressure inside the second adsorbent bed from the supply port to carry out the desorption, in which the product gas is continuously produced during this step with a moment when the enriched gas is simultaneously produced from the production ports of the first adsorbent bed and the second adsorbent bed.

According to the present invention, in the case of an oxygen concentrator, the feed gas mixture is air, the more adsorbable component is nitrogen and the less adsorbable component is oxygen. Also, preferably, the adsorption pressure is 1 to 2 atm for the VPSA and atmospheric pressure for the VSA, and the desorption pressure is 200 mmHg or more of a gauge vacuum pressure measured by a vacuum pump means (the gauge vacuum pressure is a pressure lower than the atmospheric pressure of 0).

In another aspect according to the present invention, there is provided an apparatus for concentrating a gas comprising:

a filter for filtering impurities from a feed gas mixture;

at least two adsorbent beds containing an adsorbent;

a vacuum pump means for applying a vacuum pressure inside the adsorbent bed;

a valve means for switching a path to alternately apply a vacuum pressure by the vacuum pump means and a pressure of the gas mixture;

a microtube for connecting the production ports of the adsorbents;

a check valve for flowing a product gas through each production port in one direction; and a gas discharger for inhaling the product gas which has passed the check valve and ejecting it to a target space.

Preferably, a control means may be provided between the check valve and the gas discharger to control the concentration and flux of the product gas produced from the production port of the adsorbent bed. This is because the apparatus according to the present invention is not limited to high concentration applications but also can be applied various applications from an air conditioner and a respirator of 20 to 35% or more such as an oxygen concentrator to a water purifier of 50% or more, without a big modification of the adsorbent bed.

Also, preferably, a gas mixture control means is provided between the gas discharger and the filter to control the amount of the gas mixture mixed with the product gas and thereby, control the concentration and flux of the final product gas in the connection with the control means between the check valve and the gas discharger. Generally, the adsorbent contained in the adsorbent bed can't be completely regenerated against impurities and moisture. Therefore, in terms of the life span of the adsorbent, it is preferable to reduce the amount of the gas directly passing through the adsorbent bed. According to an embodiment of the present invention, it is possible to reduce the amount of the gas passing through the adsorbent bed by mixing the gas mixture which has not passed through the adsorbent bed with the product gas which has passed through the adsorbent bed using the above-described two control means. When the two control means adjust the concentration and flux of the enriched gas used in a given application, the control means between the gas discharger and the filter is adjusted to minimize the flux passing through the adsorbent bed.

The vacuum pump means and the gas discharger can be driven by an identical motor. Also, it is preferable that the opening and closing vacuum pressure of the check valve is set as low as 100 mmHg or less of a gauge vacuum pressure, preferably 50 mmHg or less, thereby the second step and the fourth step are carried out by a simple path conversion using a valve of the gas mixture supply port of the adsorbent bed.

DETAILED DESCRIPTION OF THE PREFERRED EMBODIMENT

Now, the present invention is described in further detail with reference to the preferred embodiment.

Figure 3:
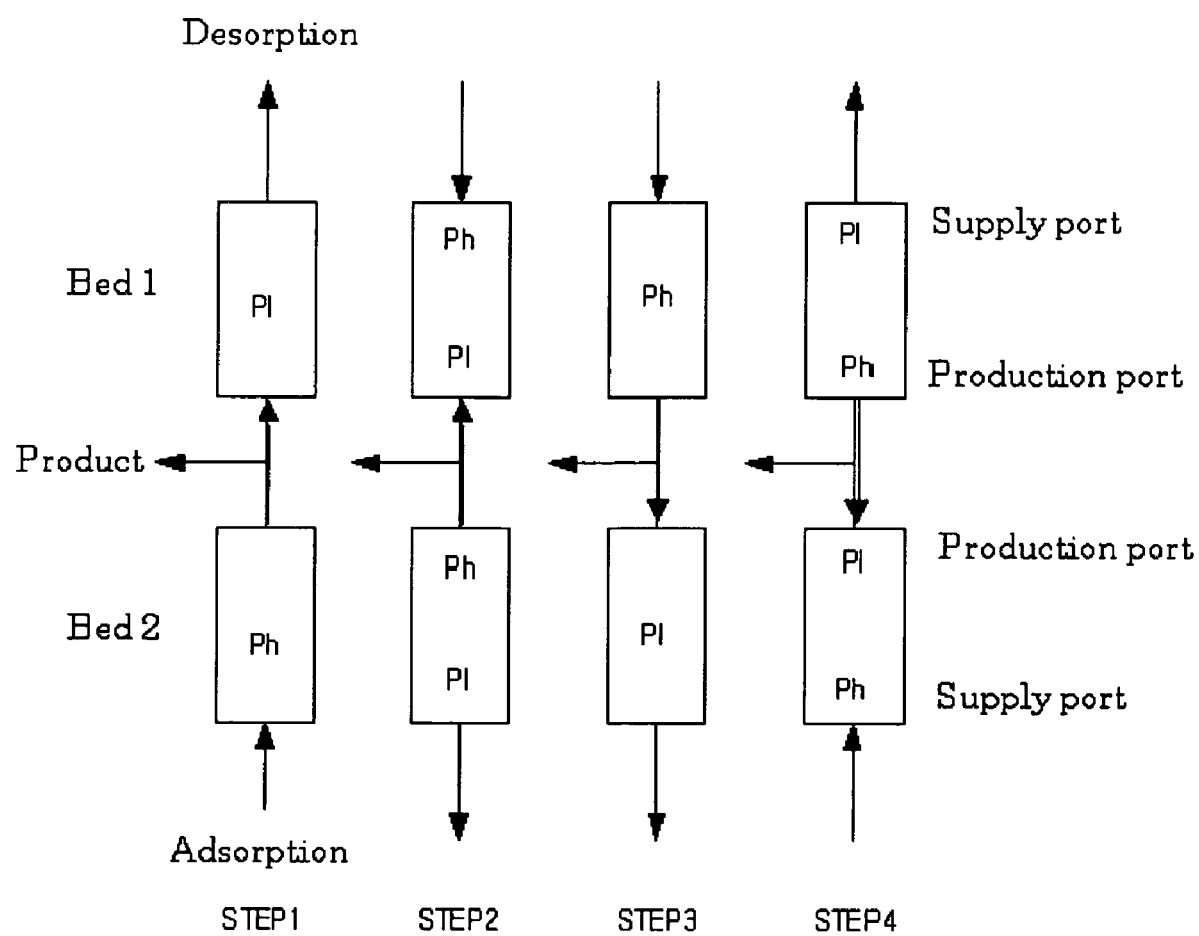
FIG. 3 is a view showing the standard 4 steps of the method according to the present invention.

FIG. 3 is a diagram showing the process according to the present invention. The process comprises standard 4 steps, in which Pl (P low) and Ph (P high) represent a relatively lower pressure and a relatively higher pressure, respectively, in an adsorbent bed.

Referring to FIG. 3, the first step shows the desorption in an adsorbent bed 1 and the adsorption in an adsorbent bed 2. From the viewpoint of the adsorbent bed 2, a gas mixture is introduced to the adsorbent bed 2, in which a more adsorbable gas is adsorbed to the adsorbent while a less adsorbable gas of a product gas is discharged through a production port which is an outlet of the product gas. A part of the product gas is introduced through a production port of the adsorbent bed 1 to purge the adsorbent of the adsorbent bed 1 by a relatively high pressure and high concentration. The first step is suitably carried out in 2 to 5 seconds in a small-size oxygen concentrator. Considering that the present invention is to be applied to the VPSA and the VSA and is focused on the use of a pressure as low as possible, the gas mixture supplied through the supply port to the adsorbent bed 1 has suitably a pressure of 2 atm or less for the VPSA and the atmospheric pressure or a slight vacuum of several tens mmHg lower than the atmospheric pressure for the absolute VSA.

The second step occurs for a relatively short period of time (2 seconds or less in a small size apparatus), as compared to the first step. The supply of the gas mixture through a supply port (suction port of the gas mixture) of the adsorbent bed 2 is stopped and the depressurization by a vacuum pump means is initiated, whereby the desorption is initiated. On the other hand, to the supply port of the adsorbent bed 1, the gas mixture is supplied to increase the pressure in the adsorbent bed 1, whereby the adsorption is initiated. However, there still exists a pressure gradient in the adsorbent bed 1 and the adsorbent bed 2, in which the production port of the adsorbent bed 2 has a pressure higher than the production port of the adsorbent bed 1. Therefore, a part of an enriched gas flows from the production port of the adsorbent bed 2 to the production port of the adsorbent bed 1. At this moment, the enriched gas is continuously produced from the production port of the adsorbent bed 2. However, near the point at which the pressure of the production port of the adsorbent bed 1 is in equilibrium with the pressure of the production port of the adsorbent bed 2, the enriched gas begins to be simultaneously produced from the two adsorbent beds. The second step is continued after the enriched gas is simultaneously produced from the two adsorbent beds until the pressure gradient between the production ports of the adsorbent beds are reversed, whereby the gas is supplied from the production port of the adsorbent bed 1 to the production port of the adsorbent bed 2.

This part is one of the main features of the present invention which employs a pressure gradient existing in representative absorbent beds. According to the conventional technologies, in which the enriched gas is produced from each adsorbent bed by the on/off mode, at the point when the production of the enriched gas from one adsorbent bed is suspended and the production from the other adsorbent bed is initiated, the enriched gas shows severe fluctuation or reduction in discharge pressure. The present invention considerably relieves such problems.

The third step is performed in the way reversed to the first step, as the pressure of the production port of the adsorbent bed 1 becomes higher than the production port of the adsorbent bed 2. That is, as the flow of the enriched gas between the production ports in the first step is reversed, a part of the product is refluxed from the production port of the adsorbent bed 1 to the production port of the adsorbent bed 2 and the product gas is continuously discharged. Thus, the adsorbent bed 2 undergoes the desorption and the adsorbent bed 1 undergoes the adsorption. From the viewpoint of the adsorbent bed 1, the gas mixture is continuously introduced to the adsorbent bed 1, in which a more adsorbable component is adsorbed to the adsorbent while a less adsorbable component of a product gas is discharged through the production port which is an outlet of the product gas. A part of the product gas is introduced from a production port of the adsorbent bed 1 to purge the adsorbent of the adsorbent bed 2 by a relatively high pressure and high concentration.

The fourth step is a transition period in which the adsorption and the desorption are reversed between the adsorbent beds, as in the second step. By the pressure gradient in respective adsorbent beds, a part of the product gas is still supplied in the same direction as in the third step, that is, a part of the enriched gas is supplied from the production port of the adsorbent bed 1 to the production port of the adsorbent bed 2. At this moment, the product gas is continuously discharged. Thus, the supply of the gas mixture through a supply port (suction port for the gas mixture) of the adsorbent bed 1 is stopped and the depressurization by a vacuum pump means is initiated, whereby the desorption is initiated. On the other hand, the gas mixture is supplied through the supply port of the adsorbent bed 2 to increase the pressure in the adsorbent bed 2, whereby the adsorption is initiated. In the fourth step, there also exists a period when the enriched gas is simultaneously produced from the adsorbent beds 1 and 2.

Upon the transition from the second step to the third step and from the fourth step to the first step, the pressure at the production port of each adsorbent bed and the flow of the enriched gas undergo the same procedures.

Figure 6:
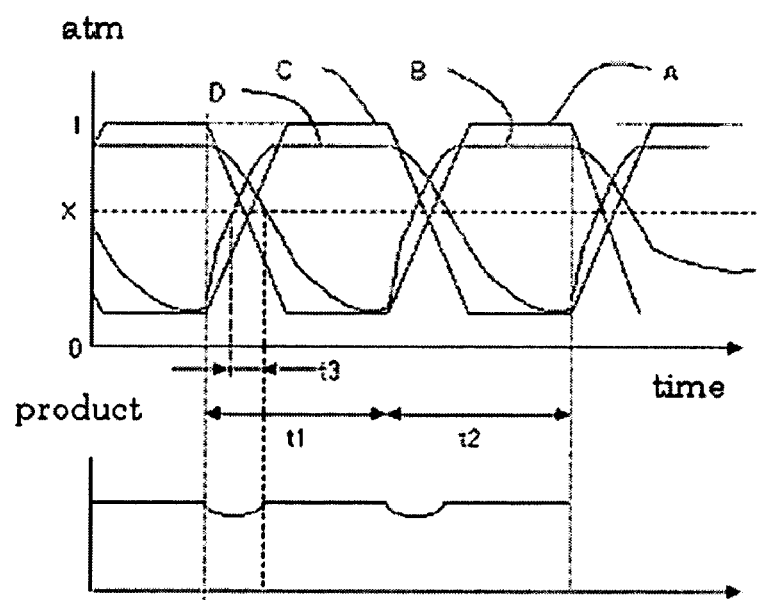
FIG. 6 is a view schematically showing the pressure distribution in the adsorbent bed of the gas concentration apparatus according to the present invention.
Figure 7:
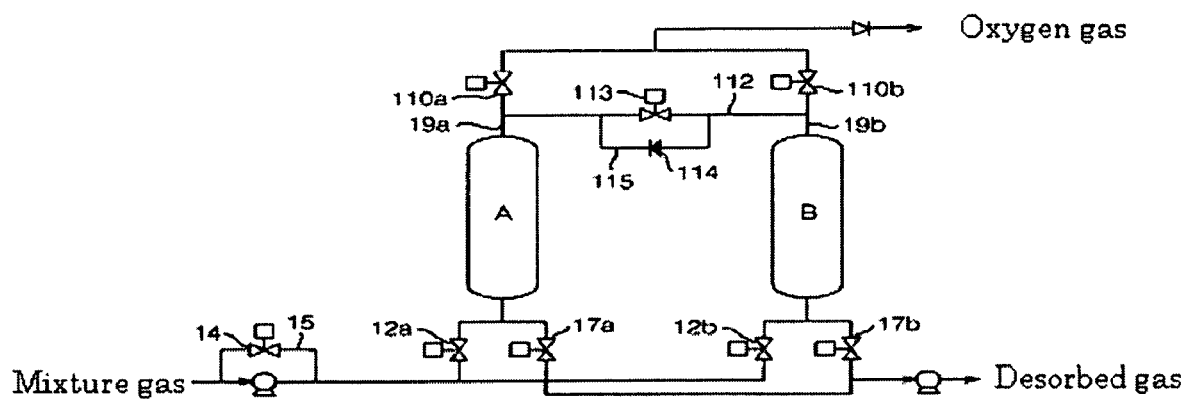
FIG. 7 is an example of the gas concentration apparatus for the conventional PSA process.

The fluctuation in pressure of each adsorbent according to time in each step is shown in FIG. 6 and is explained in detail below.

The flow of the enriched gas between the adsorbent beds in each step uses the pressure difference between the production ports of the respective adsorbent beds. Though there is no particular need of an apparatus or a valve to control the flow of the enriched gas, orifices suitably designed between the respective production ports may be preferably used to more smoothly produce the enriched gas.

The pressures at the supply ports in the above-described are suitably in the range of several tens mmHg of a gauge vacuum pressure to the atmospheric pressure for the VSA and about 2 atm or less for the VPSA using a vacuum pump means and an air compression means. The pressure at the production port is determined by the pressure at the supply ports and the method for discharging the product. It is generally operated in the range of a gauge vacuum pressure of 300 mmHg to 1.8 atm. The discharge pressure of the enriched gas is determined by a gas discharger, where it is used. When it is determined by the pressure of the supplied gas, as in the VPSA process, it is suitably 1.8 or less atm. In case of the VSA as an embodiment according to the present invention, in which the enriched gas is supplied by a vacuum pump means and a gas discharger, the adsorption pressure is preferably a pressure of the gas mixture. In case of the separation of oxygen in the air, it is suitably the atmospheric pressure. The desorption pressure is preferably 200 mmHg or more of a gauge vacuum pressure which is determined by a vacuum pump means. The pressure of the production port is preferably in a pressure range of about several tens mmHg to 300 mmHg lower than the atmospheric pressure.

Also, the supplied gas mixture is preferably the air, since the present invention is focused on the application to the oxygen separation. For oxygen concentration, when the more strongly adsorbable component of the adsorbent is nitrogen and the less strongly adsorbable is oxygen, the produced gas is oxygen while the desorbed gas is nitrogen. Of course, various types of gases can be separated and concentrated according to properties of the adsorbent contained in the adsorbent bed. According to the present invention, it is possible to select an adsorbent suitable for the type of the gas to be produced.

Figure 1:
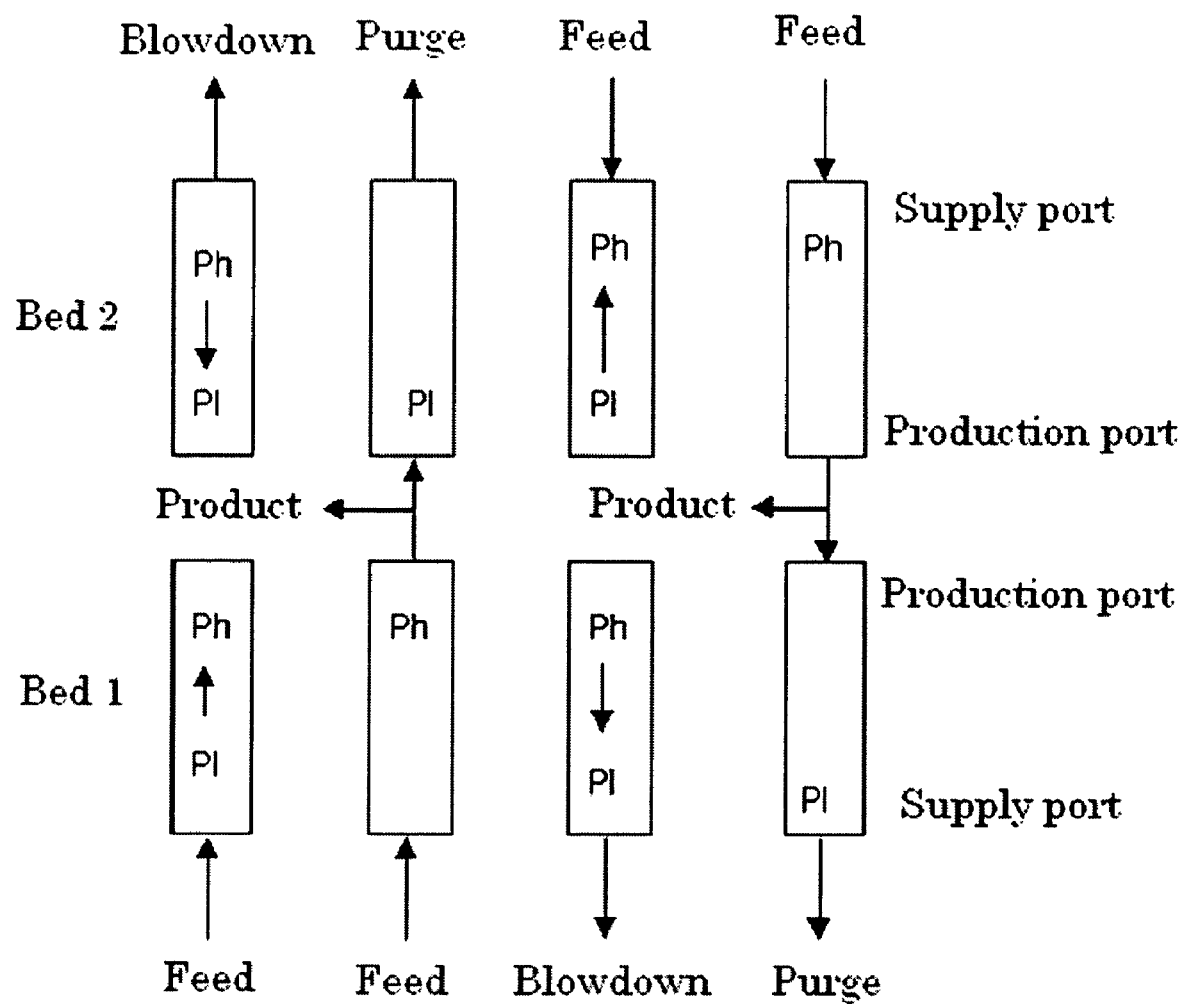
FIG. 1 is a view showing the standard 4 steps of the conventional PSA (pressure swing adsorption) method.
Figure 2:
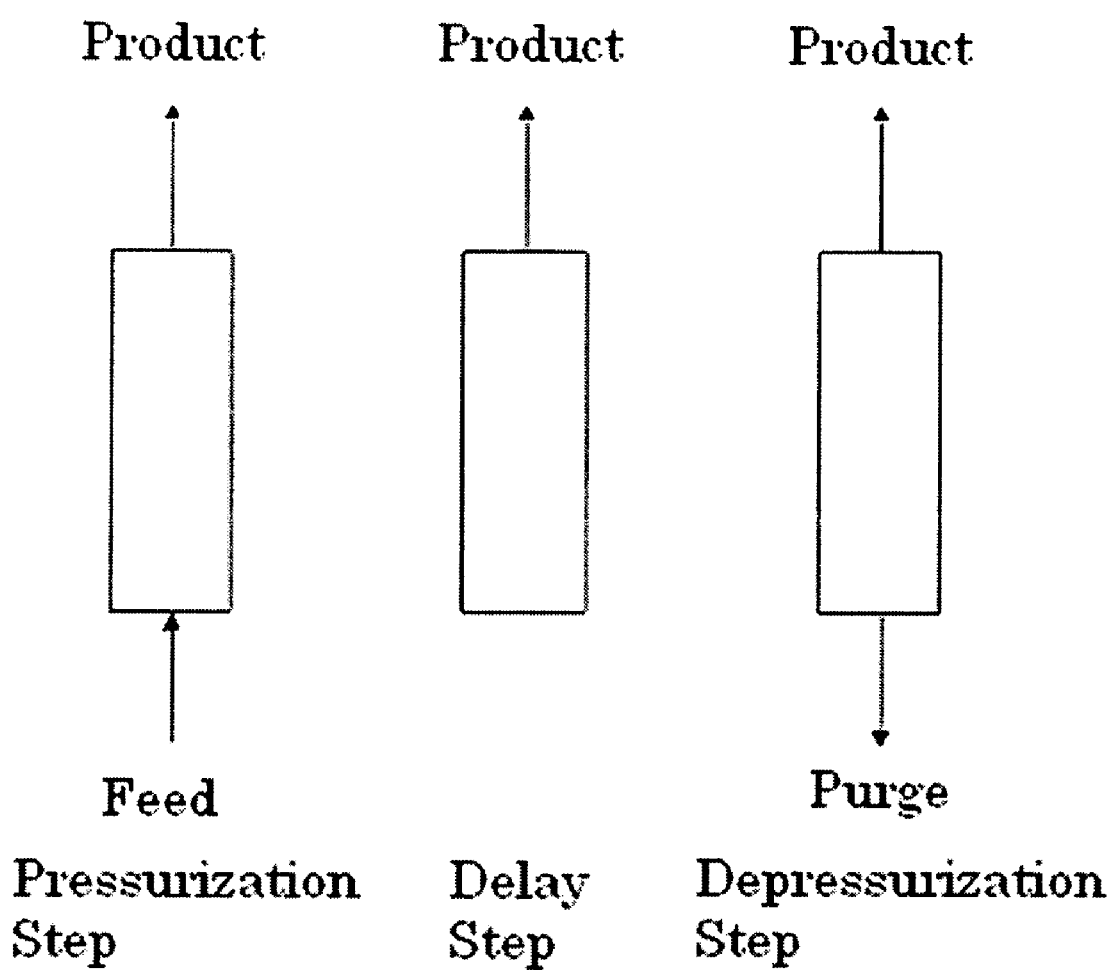
FIG. 2 is a view showing the standard 3 steps of the conventional RPSA method.

Referring to FIG. 3 showing an embodiment according to the present invention, unlike FIG. 1, the production is performed in every step and the continuous production can be accomplished. Also, the production flow at the production ports is smooth while its variation is very small. Each step of one cycle is rapidly performed in several seconds. Each step can be performed in 3 seconds. Upon application to a micro-size bed such as a small size oxygen concentrator for household use, the entire cycle can be performed in the range of up to 10 seconds.

In the process shown in FIG. 1, the production process is discontinuously performed in practice. Therefore, the production flux greatly varies at every steps, which leads need of a surge tank (U.S. Pat. No. 6,663,691, JP-A-4-505448, 4-222613). Alternatively, the pressure change and the flux change can be reduced by expansion to the multi-bed process. In this case, the construction of valves becomes complicated and thus, it is necessary to control the adsorption and the desorption by using a rotary valve having a rotating plate equipped with a path which is driven by a motor. On the other hand, in FIG. 3, through the whole steps, the enriched gas is continuously produced. Also, the flow of the product gas at the production port is smooth. Therefore, the fluctuation in discharge pressure and flux of the enriched gas can be maintained small only by using two adsorbent beds, without need of an additional surge tank.

Figure 4:
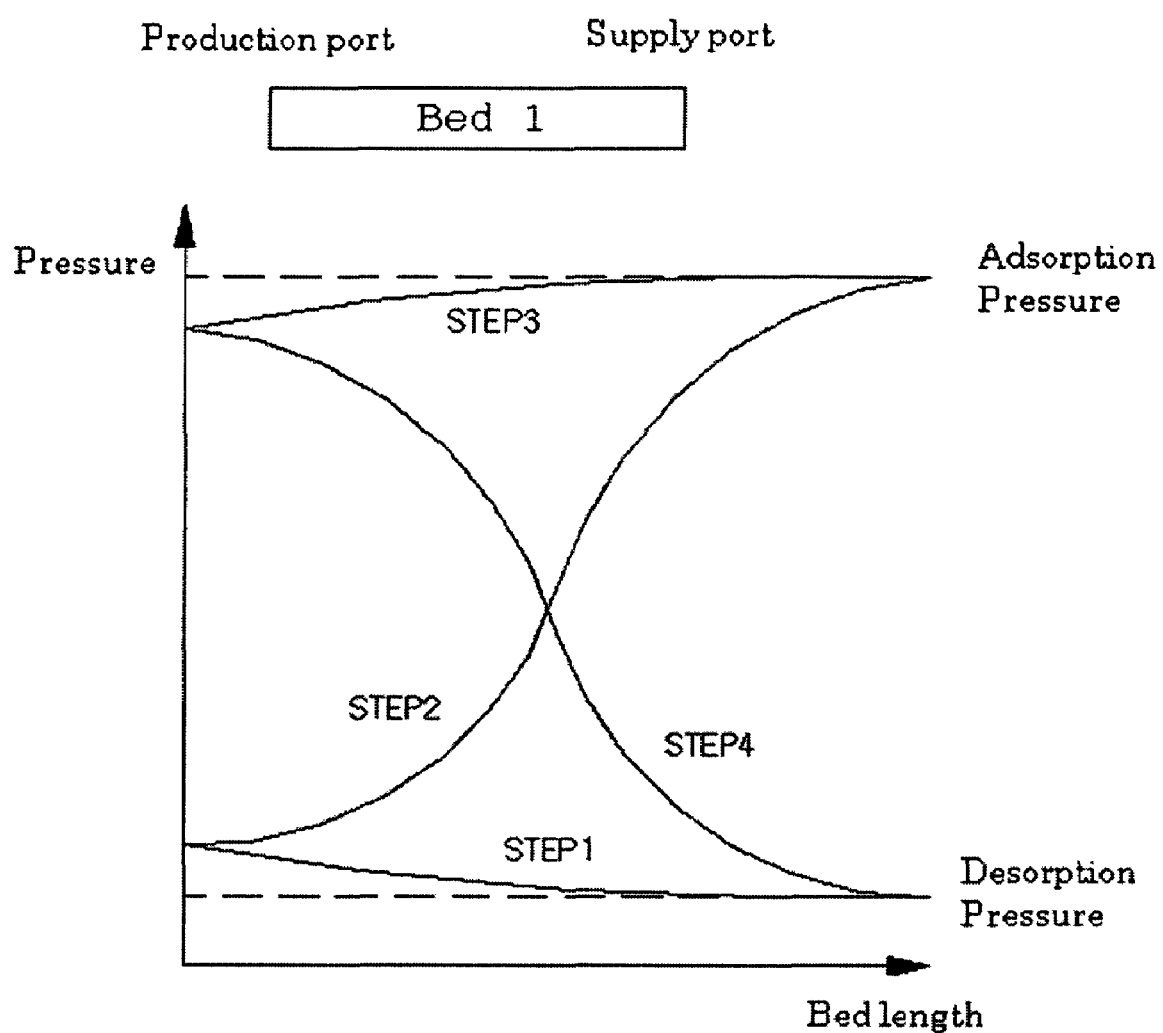
FIG. 4 is a graph showing the pressure distribution in the adsorbent bed according to the present invention.

FIG. 4 schematically shows the pressure distribution according to the length of the adsorbent bed 1. As shown in FIG. 4, similarly to the RPSA, small adsorbent particles in the adsorbent bed are used to display a pressure gradient. The adsorbent bed is packed with adsorbent particles with a size as small as possible. Since each step is carried out in a very short period of time, there exists a pressure gradient between the inlet and the outlet. The two great pressure gradients are created in the second step and the fourth step, which continue until the pressures between the production ports of the adsorbent bed 1 and the adsorbent bed 2 are in equilibrium with each other. As the second step progresses, the pressure of the production port of the adsorbent bed 1 increases more than the pressure of the production port of the adsorbent bed 2, whereby reflux from the production port of the adsorbent bed 1 to the production port of the adsorbent bed 2, as in the third step is generated to produce the enriched gas.

Figure 5:
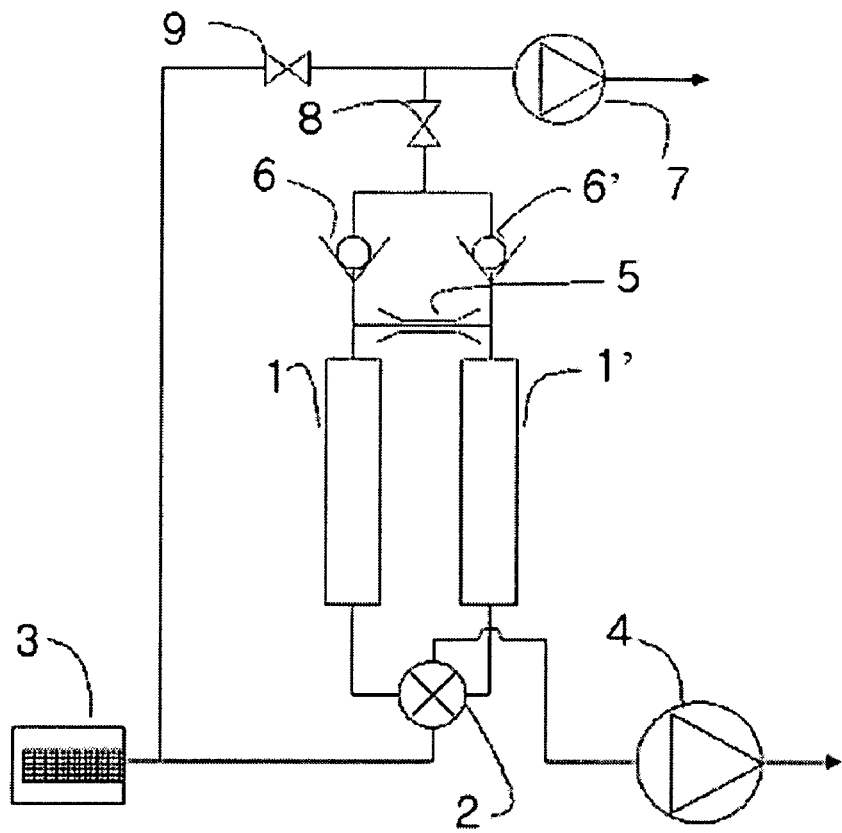
FIG. 5 is an example of the gas concentration apparatus according to the present invention.

The process according to the present invention is preferably applied to the VPSA and the VSA, in which the desorption pressure undergoes vacuumization, as described in the respective steps, though it can be applied to the PSA process operated at a pressure higher than normal pressure. For continuous production in each step, an apparatus for the VSA, as described in FIG. 5, is more suitable, in which a separate pump for discharging the product gas is used to reduce the product flux change and to allow a quiet operation at a low pressure difference. This is because the present invention aims at the application in a small oxygen concentrator. For the quiet operation and mass production, high performance adsorbents which have been recently developed should be used and thus, the desorption pressure should be preferably set under the vacuum pressure. It is known that the long-term regeneration of the absorbent is relatively difficult by a simple atmospheric purge condition and a relatively high concentration oxygen clean. Therefore, the process according to the present invention is preferably performed in the range of the atmospheric or more to a vacuum pressure, or absolutely in the atmospheric pressure or less, as in FIG. 5. FIG. 5 shows an embodiment of a gas concentration apparatus having two adsorbent beds applying the above-described process which is operated under the atmospheric pressure.

As shown in FIG. 5, the gas concentration apparatus using the process according to the present invention comprises a filter 3 to filter impurities from the gas mixture, adsorbent beds 1,1', each containing an adsorbent therein, a vacuum pump means 4 to apply a vacuum pressure to the adsorbent beds 1,1', a valve means 2 to alternately apply the pressure of the gas mixture which has passed through the filter 3 and the vacuum pressure by the vacuum pump means 4 to the adsorbent beds 1,1', a microtube 5 to flow a part of the product gas produced in one adsorbent bed to the other adsorbent bed, check valves 6,6' to flow the product gas in one direction and a gas discharger 7 to eject the resulting enriched gas to a desired space, and further comprises control means 8,9 to control the amount and concentration of the product gas.

The gas discharger 7 may be a kind of a vacuum pump and should have a vacuum pressure enough to inhale the enriched gas through the control means 8 and the check valves 6,6' from the production ports of the adsorbent beds 1,1' and to eject them. Therefore, the check valves 6,6' preferably have a low opening and closing vacuum pressure. For this reason, the check valve is preferably in a simple form composed of rubber without using a spring. Where it is combined with a spring, the spring is preferably a small-size spring with a low elasticity. The gas discharger 7 may be provided with a separate pump means or use two vacuum pump heads equipped at a motor of the vacuum pump means 4 which are respectively driven as a vacuum pump. The valve means 2 comprises a solenoid valve which is commonly used as known to the art. In this case, it is apparent that a separate control means is needed. It is also possible to use a rotary valve comprising a rotating plate with a path integrated in a motor as the valve means 2. It is known to the skilled in the art that the rotary valve can accomplish the channel switch only by mechanical driving without using a separate electronic circuit board to control a solenoid valve.

The microtube 5 is a part to connect the production ports of the respective adsorbent beds 1,1' and preferably comprises orifices having a predetermined flow resistance. It can be directly connected to openings of the adsorbent beds 1,1' or use a separate orifice part.

In connection with the method and the apparatus according to the present invention, the prior arts related to RPSA and the prior arts related to VSA are incorporated fully herein as reference.

The apparatus of FIG. 5 is operated as follows. Firstly, in the first step, a vacuum pressure is applied through the valve means 2 to the adsorbent bed 1 by the vacuum pump means 4, beginning with the supply port of the gas mixture, the inside of the adsorbent bed 1 is depressurized, reaching the vacuum pressure, whereby the adsorbent bed 1 undergoes a desorption process. At this point, a part of the enriched gas produced in the other adsorbent bed 1' is introduced to the adsorbent bed 1 through the production port for the purgation. The gas discharger 7 inhales the enriched gas produced in the adsorbent bed 1' and ejected it to a desired space. In the second step, the gas mixture which has passed through the filter 3 and the valve means 2 is introduced to the adsorbent bed 1 through the inlet by the difference between the pressure of the gas mixture and the vacuum pressure in the bed, upon which the pressure in the bed is elevated. Since the pressure of the production port of the adsorbent bed 1 is still lower than that of the production port of the adsorbent bed 1', a part of the product gas is introduced to the adsorbent bed 1 while the production in the adsorbent bed 1' continues. Before and after the pressures of the production ports of the adsorbent beds 1,1' are identical, the production simultaneously takes place in both the adsorbent beds 1,1'. Here, the gas discharger 7 should have a suction force enough to inhale the product gas from the production port of the adsorbent beds 1,1' against the resistance of the check valves 6,6'. Thus, the check valves 6,6' should have a sufficiently low open/close pressure, as described above. Next, the third step is initiated for the production in the adsorbent bed 1. Contrary to the first step, the adsorbent bed 1 takes charge of the production while the adsorbent bed 1' undergoes the desorption and the purgation. The fourth step is a reverse of the second step, in which the adsorbent beds 1,1' change their roles with another.

Here, the control means 8 controls the flux and concentration of the product gas which has passed through the adsorbent beds 1,1'. The control means 9 properly mixes the gas mixture which has passed through the filter 3 with the gas produced by the adsorbent beds 1,1' to control the flux and concentration of the enriched gas ejected by the gas discharger 7. A variable flux control valve may be used and a fixed orifice may be used to obtain a fixed concentration and flux of the final enriched gas. The adsorbent contained in the adsorbents bed 1,1' can't be completely regenerated against impurities and moisture. In terms of the life span of the adsorbents, it is preferable to reduce the amount of the gas which directly passes the adsorbent beds 1,1'. In an embodiment according to the present invention, it is possible to reduce the amount of the gas which passes the adsorbent beds by mixing the gas mixture which has not passed through the adsorbent beds with the gas mixture which has passed through the adsorbent beds by the control means 8 and 9. When a flux and concentration for a specific application given, the control means 8 is set in the early design stage and the control means 9 is then modified to tune a target concentration and a flux while minimizing the amount of the gas passing through the adsorbent beds by a method for examining whether the flux is accomplished at the target concentration. Once the tuning completed, the fixed orifice can be used to accomplish the fixed target concentration and flux, as described.

The opening and closing pressure of the check valves 6,6' and the suction pressure of the gas discharger 7 are very important in operating as described above. If the opening and closing pressure of the check valves 6,6' is great, all the two check valves 6,6' may be closed by the pressures of the production ports of the adsorbent beds 1,1'. Therefore, the opening and the closing pressure of the check valves 6,6' is preferably low. Typically, it is in the range of 100 mmHg or lower of a gauge vacuum pressure. The gas discharger 7 is a means to eject the concentrated gas into a desired space and whether its discharge pressure is critical or not is determined by the intended application. Generally, its suction force affects greatly the performance of the apparatus. In case of those having a sufficient vacuum pressure such as a piston or a diaphragm pump, it is possible to fully apply the present invention by means of the controlling means 8. On the other hand, in case of a blower with a low suction force and a bubble pump using vibration of a rubber plate by an electromagnet to supply air to a fish bowl for aquarium fish, the opening and closing pressure of the check valves 6,6' is very important. Therefore, the check valves 6,6' generally have an opening and closing vacuum pressure of 100 mmHg or less of a gauge vacuum pressure, preferably 50 mmHg or less so that the method of the present invention can be fully accomplished even when the gas discharger 7 having a low suction force of 200 nmHg or less is used. In this case, the concentration and flux can be adjusted to some degree only by the opening and closing pressure of the check valves 6,6'. Therefore, it is possible to adjust a desired concentration and flux only using the control means 9 while omitting the control means 8.

FIG. 6 is a graph illustrating the pressure change of the absorbent beds 1,1', in which the gas mixture has a pressure of atmospheric pressure. In FIG. 6, assuming that A and B are curves showing the pressure change in the gas mixture supply port and the production port, respectively, of the adsorbent bed 1, and C and D are curves showing the pressure change in the supply port and the production port, respectively, of the adsorbent bed 1', from the viewpoint of the adsorbent bed 1, t1 represents a desorption stage and t2 represents an adsorption stage. Also, X is a suction pressure on supply port by the gas discharger 7 which is a means to supply a concentrated gas. Upon comparison with a pressure applied to the production ports of the adsorbent beds 1,1' through the control means 8 and the check valves 6,6' which are resisters, if the pressures B and D of the production ports of the adsorbent beds 1,1' are higher than X, the product gas can be produced from the discharger FIG. 6 shows an embodiment capable of accomplishing the continuous production, in which t3 of the second step or the fourth step is the state where the pressure in the production ports of the adsorbent beds 1,1' are higher than the pressure X and thus, represents the stage in which the both adsorbent beds 1,1' participate in the production at the same time. It is preferred that the pressure X is set to about 100 to 300 mmHg lower than atmospheric pressure. If the pressure X is low, there is a tendency that the range where the production gas is simultaneously produced from the production ports of the adsorbent bed 1 and the adsorbent bed 2 is enlarged and the oxygen concentration in the production gas is reduced. Therefore, the pressure X is preferably set to minimize the fluctuation range of concentration and flux at a given target concentration and flux.

When the method according to the present invention is applied to the above-described VSA system, the process time of the second step and the fourth step can be adjusted by adjusting the length and diameter of the adsorbent bed and the size of the adsorbent particle to control the resistance of the inhaled gas so that the pressure gradient changes. The adsorbent used in the adsorbent bed is commercially available. For the separation of oxygen from the air, 5A-zeolite (zeolite of five angstrom unit pore size) may be commonly used. With respect to the adsorbent bed, the prior arts related with the RPSA are fully incorporated herein by reference. Also, it is possible to control the second step and the fourth step by adjusting the suction pressure of the gas discharger 7 and the opening and closing pressure of the check valves 6,6'. This adjustment is important in the control of the concentration and flux and is preferably accomplished using the separate control means 8,9 so that the gas discharger 7 has a sufficient suction pressure and the check valves 6,6' have an opening and closing pressure as low as possible.

By using the check valves 6,6' having a very low opening and closing pressure (50 mmHg or less of a gauge vacuum pressure), the method can realize the second step and the fourth step by path switch of a simple valve means without complicated valve control. That is, since the first step and the fourth have the same path direction of the adsorption and desorption in the supply ports of the adsorbent beds 1,1' and the second step and the third step also have the same path direction, a pressure gradient in the adsorbent beds 1,1' is naturally generated only by path switch through a simple on/off mode of the valve in the supply ports of adsorbent beds 1,1', whereby the four steps are performed. Of course, it is apparent to the skilled in the art that the method is performed by controlling the respective valves installed in the adsorbent beds 1,1' in accordance with a given process. Therefore, the valve means 2 can be simply realized by the control using two solenoid valves which are commonly used, or use a rotary valve operated by driving a rotating plate with a path formed on a motor, which are known to the skilled in the art. In case the check valves 6,6' having a low opening and closing vacuum pressure as described is used, the method according to the present invention can be performed by a simple valve control even when a blower or bubble pump having a low suction pressure of a gauge vacuum pressure 200 mmHg or less is used.

According to the present invention, it is possible to effectively produce a concentrated gas in a large amount by employing a process focused on productivity. By a small size gas concentrator applying the process according to the present invention, it is possible to produce a concentrated gas in a large amount. Particularly, upon the application to an oxygen concentrator for households to be combined with an electric home appliance or to a portable oxygen concentrator, it is possible to construct a small-sized, low-priced and high efficient instrument. Upon the application to a system using the VSA, the present invention can attain economical efficiency through simplification of parts, freely control flux and concentration of a concentrated gas and maximize life span of a used absorbent while overcoming the problems of noise and durability involved in the conventional small size gas concentrator.

What is claimed is:

1. A gas concentration method for separating a certain gas by applying a pressure difference to an adsorbent having an adsorption power selective for the gas, comprising:

a first step of introducing a feed gas mixture through a supply port of a first adsorbent bed having a pressure lower than the feed gas mixture, adsorbing a more adsorbable component to an adsorbent in the first adsorbent bed while desorbing the adsorbed component from a second adsorbent bed by reducing the internal pressure of the second adsorbent bed, discharging a relatively less adsorbable component through a production port of the first adsorbent bed to produce an enriched gas and supplying a part of the enriched gas to a production port of the second adsorbent bed through a microtube connecting the production ports of the adsorbent beds;

a second step of reducing the internal pressure of the first adsorbent bed from the supply port to desorb the adsorbed component and increasing the pressure inside the second adsorbent bed from a supply port by supplying the feed gas mixture through the supply port of the second adsorbent bed to adsorb the more adsorbable component, in which a pressure gradient existing between the production ports and the supply ports of the first and second adsorbent beds is such that the production port of the first adsorbent bed has a pressure higher than that of the production port of the second adsorbent bed, whereby a part of the product gas is supplied from the production port of the first adsorbent bed to the production port of the second adsorbent bed, and the product gas is continuously produced during this step with a moment when the enriched gas is simultaneously produced from the production ports of the first adsorbent bed and the second adsorbent bed;

a third step of reversing the pressure gradient between the production port of the first adsorbent bed and the production port of the second adsorbent bed in the second step so that the first adsorbent bed undergoes the desorption and the second adsorbent bed undergoes the adsorption, contrary to the first step, and discharging the enriched gas from the production port of the second adsorbent bed while supplying a part of the enriched gas produced from the production port of the second adsorbent bed to the production port of the first adsorbent bed; and a fourth step of supplying a part of the product gas from the production port of the second adsorbent bed to the production port of the first adsorbent bed by the pressure gradient between the adsorbent beds, contrary to the second step, increasing the pressure inside the first adsorbent bed from the supply port by supplying the feed gas mixture through the supply port to carry out the adsorption, reducing the pressure inside the second adsorbent bed from the supply port to carry out the desorption, in which the product gas is continuously produced during this step with a moment when the enriched gas is simultaneously produced from the production ports of the first adsorbent bed and the second adsorbent bed; and wherein a suction pressure by a gas discharger is always lower on at least one of the supply ports than on another supply port, whereby the gas is continuously produced.

2. The method according to claim 1, in which the gas mixture is air, the more adsorbable component is nitrogen and the less adsorbable component is oxygen.

3. The method according to claim 1 or 2, in which the adsorption pressure is atmospheric pressure and the desorption pressure is a gauge vacuum pressure measured by a vacuum pump means.

4. An apparatus for concentrating a gas comprising:
a filter for filtering impurities from a feed gas mixture;
at least two adsorbent beds containing an adsorbent, wherein a pressure gradient exists between a production port and a supply port of each adsorbent bed;
a vacuum pump means for applying a vacuum pressure inside the adsorbent bed;
a valve means for switching a path to alternately apply a vacuum pressure by the vacuum pump means and a pressure of the gas mixture;
a microtube for connecting the production ports of the adsorbents;
a check valve for flowing a product gas through each production port in one direction;
a gas discharger for inhaling the product gas which has passed the check valve and ejecting it to a target space; and
wherein a control means is provided between the check valve and the gas discharger to control the concentration and flux produced in the production port of an adsorbent bed, and wherein a suction pressure by the gas discharger is always lower on at least one of the supply ports than on another supply port, whereby a product gas is continuously produced with a moment when the enriched gas is simultaneously produced from the production ports of the at least two adsorbent beds.

5. The apparatus according to claim 4, in which a gas mixture control means is provided between the gas discharger and the filter to control the amount of the gas mixture mixed with the product gas, thereby controlling the concentration and flux of the final product gas.

6. An apparatus for concentrating a gas according to the method described in claim 1, comprising:
a filter for filtering impurities from a feed gas mixture;
at least two adsorbent beds containing an adsorbent;
a vacuum pump means for applying a vacuum pressure inside the adsorbent bed;
a valve means for switching a path to alternately apply a vacuum pressure by the vacuum pump means and a pressure of the gas mixture;
a microtube for connecting the production ports of the adsorbents;
a check valve for flowing a product gas through each production port in one direction; and
a gas discharger for inhaling the product gas which has passed the check valve and ejecting it to a target space.

7. The apparatus according to claim 6, in which a control means is provided between the check valve and the gas discharger to control the concentration and flux produced in the production port of the adsorbent bed.

8. The apparatus according to claim 7, in which a gas mixture control means is provided between the gas discharger and the filter to control the amount of the gas mixture mixed with the product gas, thereby controlling the concentration and flux of the final product gas.

9. The apparatus according to claim 6 or 7, in which the vacuum pump means and the gas discharger can be driven by an identical motor.

10. The apparatus according to claim 6 or 7, in which the second step and the fourth step described in claim 1 are carried out by a simple path switch to between the filter and vacuum pump means by means of the valve means, with the opening and closing vacuum pressure of the check valve being low.

11. The apparatus according to claim 6 or 7, in which the check valve has an opening and closing pressure of 50 mmHg or less of a gauge vacuum pressure and the gas discharger has an adsorption pressure of 200 mmHg or less of a gauge vacuum pressure.

12. The apparatus according to claim 6 or 7, in which the valve means is a rotary valve having a rotating plate with a path driven by a motor.

13. A gas concentration method for separating a certain gas by applying a pressure difference to an adsorbent having an adsorption power selective for the gas, comprising:
a first step of introducing a feed gas mixture through a supply port of a first adsorbent bed having a pressure lower than the feed gas mixture, adsorbing a more adsorbable component to an adsorbent in the first adsorbent bed while desorbing the adsorbed component from a second adsorbent bed by reducing the internal pressure of the second adsorbent bed, discharging a relatively less adsorbable component through a production port of the first adsorbent bed to produce an enriched gas and supplying a part of the enriched gas to a production port of the second adsorbent bed through a microtube connecting the production ports of the adsorbent beds;

a second step of reducing the internal pressure of the first adsorbent bed from the supply port to desorb the adsorbed component and increasing the pressure inside the second adsorbent bed from a supply port by supplying the feed gas mixture through the supply port of the second adsorbent bed to adsorb the more adsorbable component, in which a pressure gradient existing between the production ports and the supply ports of the first and second adsorbent beds is such that the production port of the first adsorbent bed has a pressure higher than that of the production port of the second adsorbent bed, whereby a part of the product gas is supplied from the production port of the first adsorbent bed to the production port of the second adsorbent bed, and the product gas is continuously produced during this step with a moment when the enriched gas is simultaneously produced from the production ports of the first adsorbent bed and the second adsorbent bed;

a third step of reversing the pressure gradient between the production port of the first adsorbent bed and the production port of the second adsorbent bed in the second step so that the first adsorbent bed undergoes the desorption and the second adsorbent bed undergoes the adsorption, contrary to the first step, and discharging the enriched gas from the production port of the second adsorbent bed while supplying a part of the enriched gas produced from the production port of the second adsorbent bed to the production port of the first adsorbent bed;

a fourth step of supplying a part of the product gas from the production port of the second adsorbent bed to the production port of the first adsorbent bed by the pressure gradient between the adsorbent beds, contrary to the second step, increasing the pressure inside the first adsorbent bed from the supply port by supplying the feed gas mixture through the supply port to carry out the adsorption, reducing the pressure inside the second adsorbent bed from the supply port to carry out the desorption, in which the product gas is continuously produced during this step with a moment when the enriched gas is simultaneously produced from the production ports of the first adsorbent bed and the second adsorbent bed; and wherein the second step is continued after the enriched gas is simultaneously produced from the two adsorbent beds until the pressure gradient between the production ports of the adsorbent beds is reversed.

* * * * *